United States Patent [19]
Iida et al.

[11] Patent Number: 5,414,681
[45] Date of Patent: May 9, 1995

[54] FOCUSING SEARCH CIRCUIT AND FOCUSING SERVO CIRCUIT WHICH ARE USED IN OPTICAL DISC PLAYER

[75] Inventors: Junichi Iida, Chigasaki; Syohei Aoyama, Hiratsuka, both of Japan

[73] Assignee: Hitachi, Ltd., Tokyo, Japan

[21] Appl. No.: 985,910

[22] Filed: Dec. 4, 1992

[30] Foreign Application Priority Data

Dec. 5, 1991 [JP] Japan ................................. 3-348334

[51] Int. Cl.6 ............................................. G11B 7/095
[52] U.S. Cl. ............................ 369/44.25; 369/44.29; 369/44.32
[58] Field of Search ............... 369/44.25, 44.27, 44.29, 369/44.32, 44.35, 54

[56] References Cited
U.S. PATENT DOCUMENTS

| | | | |
|---|---|---|---|
| 4,683,560 | 7/1987 | Takeuchi et al. | 369/44.25 |
| 4,786,794 | 11/1988 | Doi | 369/44.25 X |
| 4,998,233 | 3/1991 | DiMatteo et al. | 369/44.25 |
| 5,003,521 | 3/1991 | Yoshida et al. | 369/44.25 |
| 5,103,439 | 4/1992 | Bierhoff et al. | 369/44.27 |
| 5,113,384 | 5/1992 | McDonald et al. | 369/44.29 |
| 5,148,423 | 9/1992 | Gleim | 369/44.27 |

*Primary Examiner*—W. R. Young
*Attorney, Agent, or Firm*—Antonelli, Terry, Stout & Kraus

[57] ABSTRACT

Disclosed is a focusing search circuit to activate a focusing servo loop of an optical disc player for driving an objective lens and for focusing a laser beam onto a signal recording surface of an optical disc. The circuit has a DC bias applying circuit for applying a DC signal of a predetermined level to an output signal of a photodetector which is a fluctuation of an AC signal centering about a predetermined DC signal level in the focusing search operation. The output signal of the photodetector which has been shifted by the predetermined level is compared with a reference voltage having a predetermined DC level of the photodetector before it is shifted by a comparing circuit. When the laser beam is in almost the in-focus state, the comparing circuit detects the coincidence between both of the above signals and activates the servo loop.

14 Claims, 7 Drawing Sheets

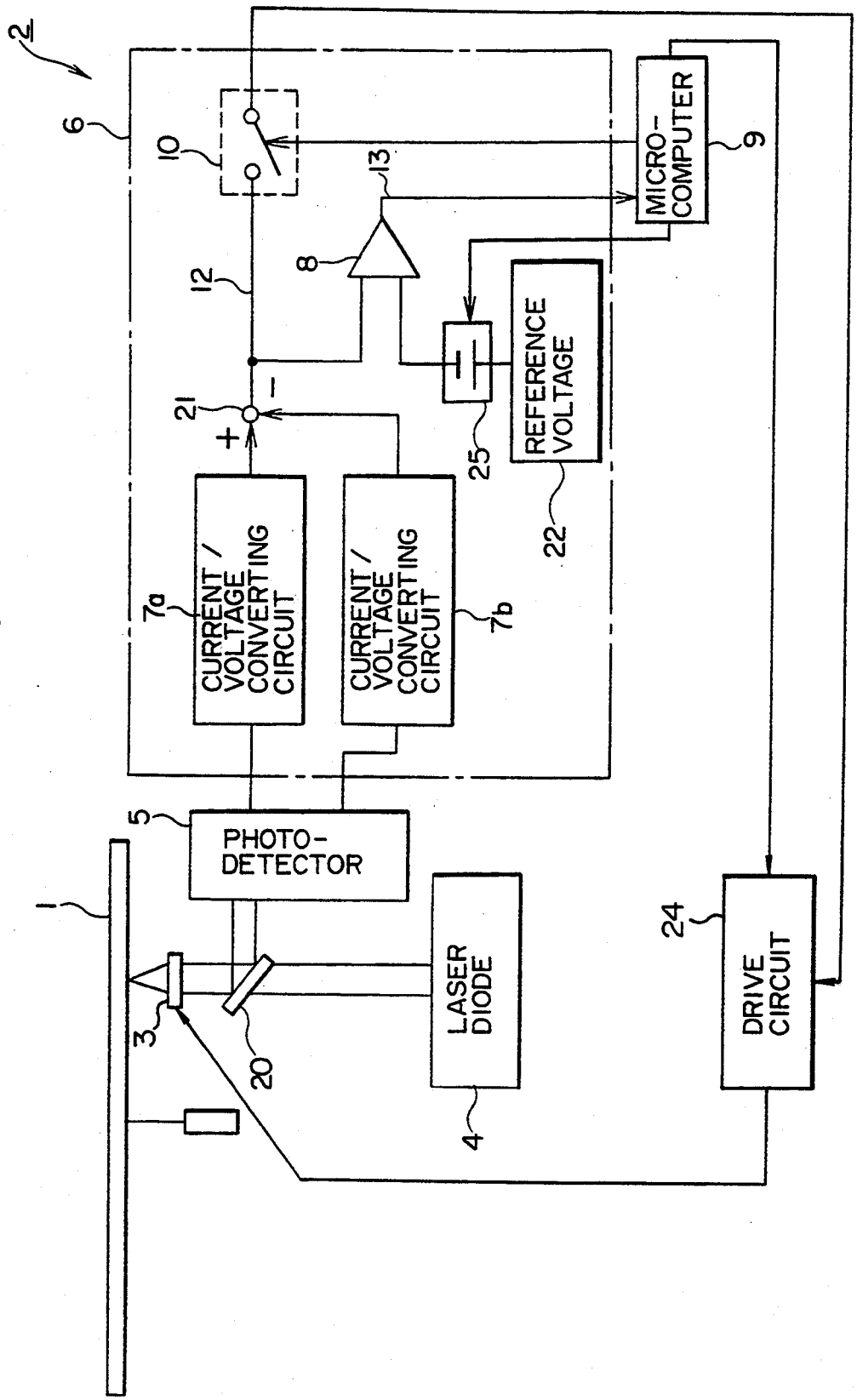

FOCUSING SEARCH CIRCUIT AND FOCUSING SERVO CIRCUIT WHICH ARE USED IN OPTICAL DISC PLAYER

BACKGROUND OF THE INVENTION

The invention relates to an optical disc player and, more particularly, to a focusing search circuit and a focusing servo circuit in an optical disc player.

FIG. 1 is a block diagram showing a focusing servo circuit in a conventional optical disc player.

In the diagram, reference numeral 1 denotes a disc (for instance, optical recording and reproducing medium such as laser disc, compact disc, or the like); 2 a disc player; 3 an objective lens; 4 a laser diode; 20 a translucent mirror; 5 a two-divided photodetector; 6 a focusing search circuit; 7a and 7b current/voltage converting circuits; 21 a differential amplifying circuit; 12 a focusing error voltage; 8 a comparator; 9 a system microcomputer; 22 a reference voltage; 13 a comparator output signal; 10 a focusing servo loop switch; and 24 a drive circuit of the objective lens 3.

The photodetector 5 and the current/voltage converting circuits 7a and 7b form converting means for converting the reflected light from the disc 1 into the voltage signals. The photodetector 5, current/voltage converting circuits 7a and 7b, differential amplifying circuit 21, switch 10, drive circuit 24, and objective lens 3 form a servo loop when the switch 10 is closed by the microcomputer 9.

The operation will now be described. When the compact disc 1 is loaded into the compact disc player 2, the microcomputer 9 first instructs the drive circuit 4 to perform the focusing search operation to vertically move the objective lens 3 in a manner such that a distance between the objective lens 3 and the signal recording surface of the compact disc 1 is set to the optimum distance.

The focusing search operation is executed in the following manner. A laser beam is emitted from the laser diode 4 and passes through the translucent mirror 20 and the objective lens 3 and is irradiated onto the signal recording surface of the compact disc 1. The reflected light from the signal recording surface is reflected by the mirror 20 and is detected by the two-divided photodetector 5, from which current signals are generated. The two current signals are converted into the voltages by the current/voltage converting circuits 7a and 7b, respectively. A difference between the voltages is obtained by the differential amplifying circuit 21, so that the focusing error voltage 12 is derived.

FIG. 2 shows a change in the focusing error voltage 12 when the objective lens 3 is allowed to approach (is elevated up) from the lower position toward the disc 1. In FIG. 2, when the objective lens 3 reaches a center position 16, the lens 3 is located at the optimum position for the signal recording surface of the disc 1. In this instance, the laser beam is focused onto the signal recording surface of the disc 1 through the lens 3. A technique similar to this focusing servo technique is disclosed in, for example, Iwamura, "Introduction to Video Disc and DAD", Corona Publishing Co., Ltd., pages 136 to 138, November, 1982.

The focusing error voltage 12 from the differential amplifying circuit 21 is compared with the reference voltage 22 by the comparator 8. Since the reference voltage 22 is set so that both of the focusing error voltage 12 and the reference voltage 22 coincide at the timing of the position 16, when both of those voltages coincide, the laser beam is focused onto the signal recording surface. The comparator output signal 13 changes or falls as shown at the timing 16 in FIG. 2, thereby informing the in-focus state of the laser beam to the system microcomputer 9. The system microcomputer 9 turns on the focusing servo loop switch 10, completing the focusing search operation. In the servo loop mentioned above, the system microcomputer 9 subsequently executes the focusing servo operation to fixedly keep the distance between the objective lens 3 and the signal recording surface of the compact disc 1 to the optimum distance.

SUMMARY OF THE INVENTION

In the conventional focusing search circuit as described above, there is the following problem. That is, there is a case where a false in-focusing position signal is generated at a timing different from the normal timing due to an output signal fluctuation of the photodetector which occurs due to a manufacturing variation of the optical system of the disc player, adjustment variation, and the like.

FIG. 3 shows such a situation. Namely, a signal fluctuation F occurring because of the above reason occurs in the focusing error voltage 12, so that the false signal occurs in the comparator output signal 13 prior to the normal timing 16. When such a false signal is generated, the objective lens 3 is fixedly held at the position where the distance from the signal recording surface is not optimum, so that such a disc player is regarded as a defective manufacturing article.

To supplement the causes of the generation of the signal fluctuation F mentioned above, the following causes are considered: a manufacturing variation of the photodetectors; a manufacturing variation of the optical path from the photodiode to the photodetector at which the laser beam emitted from the laser diode arrives; a defect and a loss of the reflected light by an abnormality of the signal recording surface of the disc; a manufacturing variation of the laser diode, an integrated adjustment variation of the laser diode, photodetector, objective lens position optical path, etc.; and the like.

When those variation elements exceed predetermined permissive ranges, if the focusing search operation is performed, a false optimum position detection signal is generated from the photodetector at a timing different from the timing at which the objective lens reaches the optimum position. Consequently, the focusing search operation fails and the focusing servo is not correctly performed.

It is, therefore, an object of the invention to solve the problems of the conventional techniques as mentioned above and to provide a focusing search circuit and a focusing servo circuit in an optical disc player which can correctly perform the focusing search operation even in the case where the variation elements as mentioned above exceed the permissive ranges. Thus, a manufacturing yield can be improved in the manufacturing of such focusing search circuit and focusing servo circuit.

According to one aspect of the invention, the above object is accomplished by a focusing servo circuit of an optical disc player, in which in order to exclude a fluctuation in an output signal of a photodetector in the focusing search operation and to detect only a true signal recording surface detection signal, a DC signal of a fixed level is applied to the output signal of the photodetector that is generated as an AC signal fluctuation centering about a predetermined DC signal level to generate a synthesized signal, and the synthesized signal of those signals is detected by a comparator using the predetermined DC signal level as a reference voltage. According to an embodiment, a circuit to apply the DC signal of a predetermined level is provided between the photodetector and the comparator.

By detecting a signal change by the comparator after the DC signal was applied to the output signal of the photodetector by the DC signal applying circuit, even if the photodetector output signal fluctuates due to some abnormality, no problem occurs in the focusing search operation, so long as the fluctuation amount is equal to or less than the applied DC signal, so that the stable focusing search operation can be executed.

More specifically, in FIG. 3, even when the signal fluctuation F due to the variation elements occurs in the focusing error voltage 12, the comparator output signal 13 doesn't change or fall by such fluctuation F. The comparator output signal 13 can change or fall only at the subsequent normal timing 16 (strictly speaking, timing near the timing 16).

BRIEF DESCRIPTION OF THE DRAWINGS

FIG. 3 is a waveform diagram showing changes in focusing error voltage and comparator output signal in the circuit of FIG. 1 in the case where there are a manufacturing variation and the like;

FIG. 6 is a block diagram showing another embodiment of a focusing servo circuit of the invention;

DESCRIPTION OF THE PREFERRED EMBODIMENTS

Figure 1:
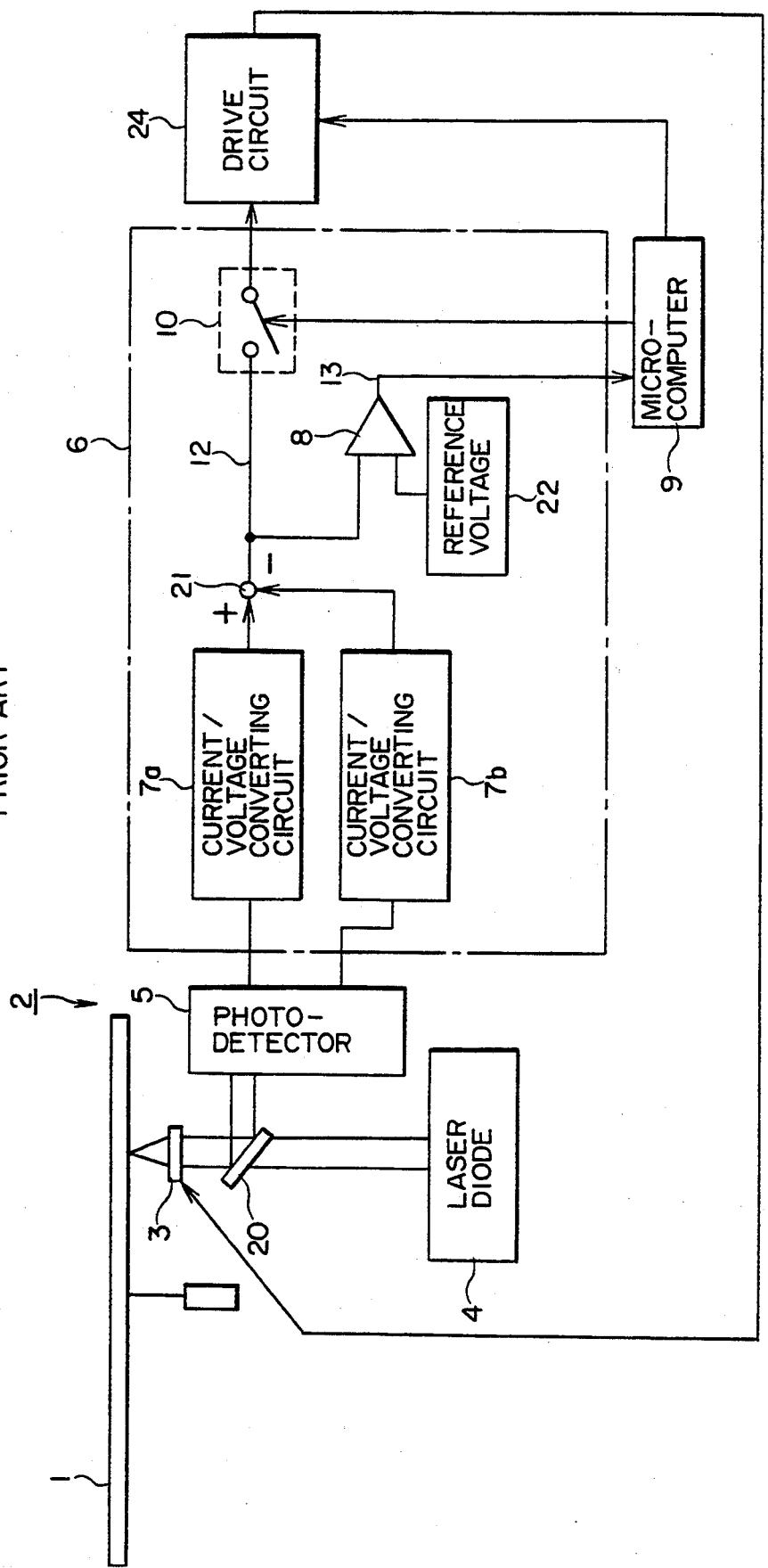
FIG. 1 is a block diagram showing a conventional example of a focusing servo circuit in an optical disc player.
Figure 2:
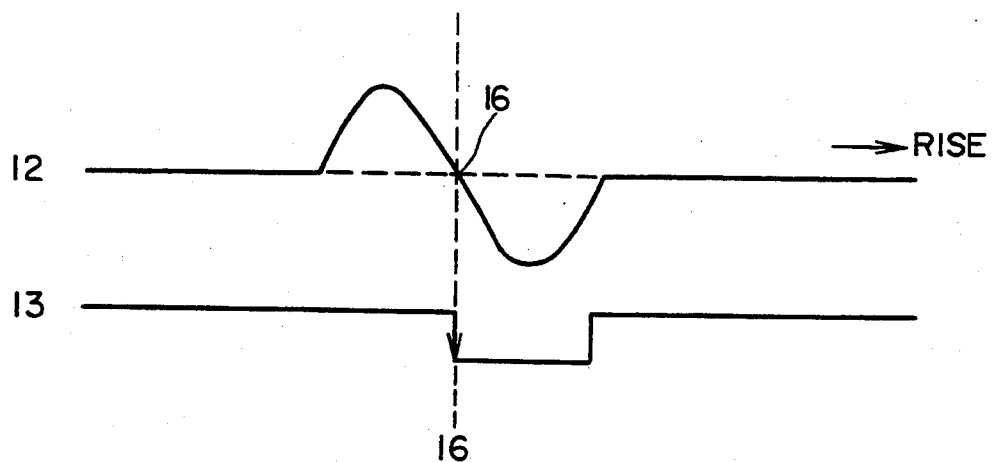
FIG. 2 is a waveform diagram showing change in focusing error voltage and comparator output signal in the circuit of FIG. 1.
Figure 3:
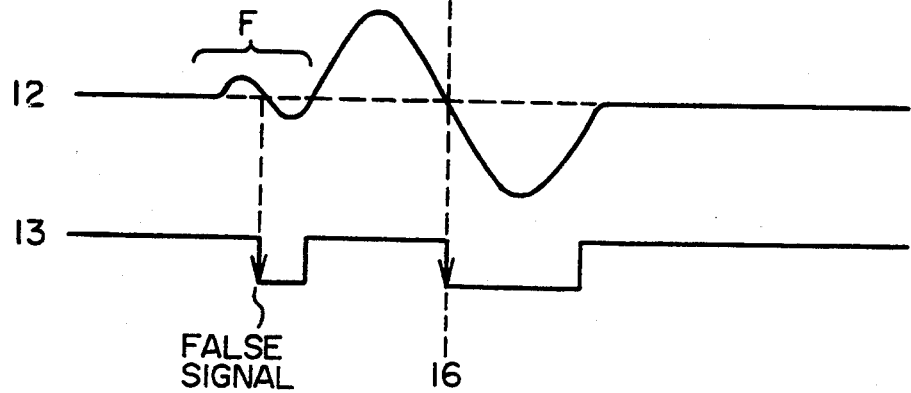

Embodiments of the invention will be described hereinbelow with reference to the drawings. Similar component elements in all of the drawings are designated by the same reference numerals and repeated descriptions of the same component elements are omitted.

Figure 4:
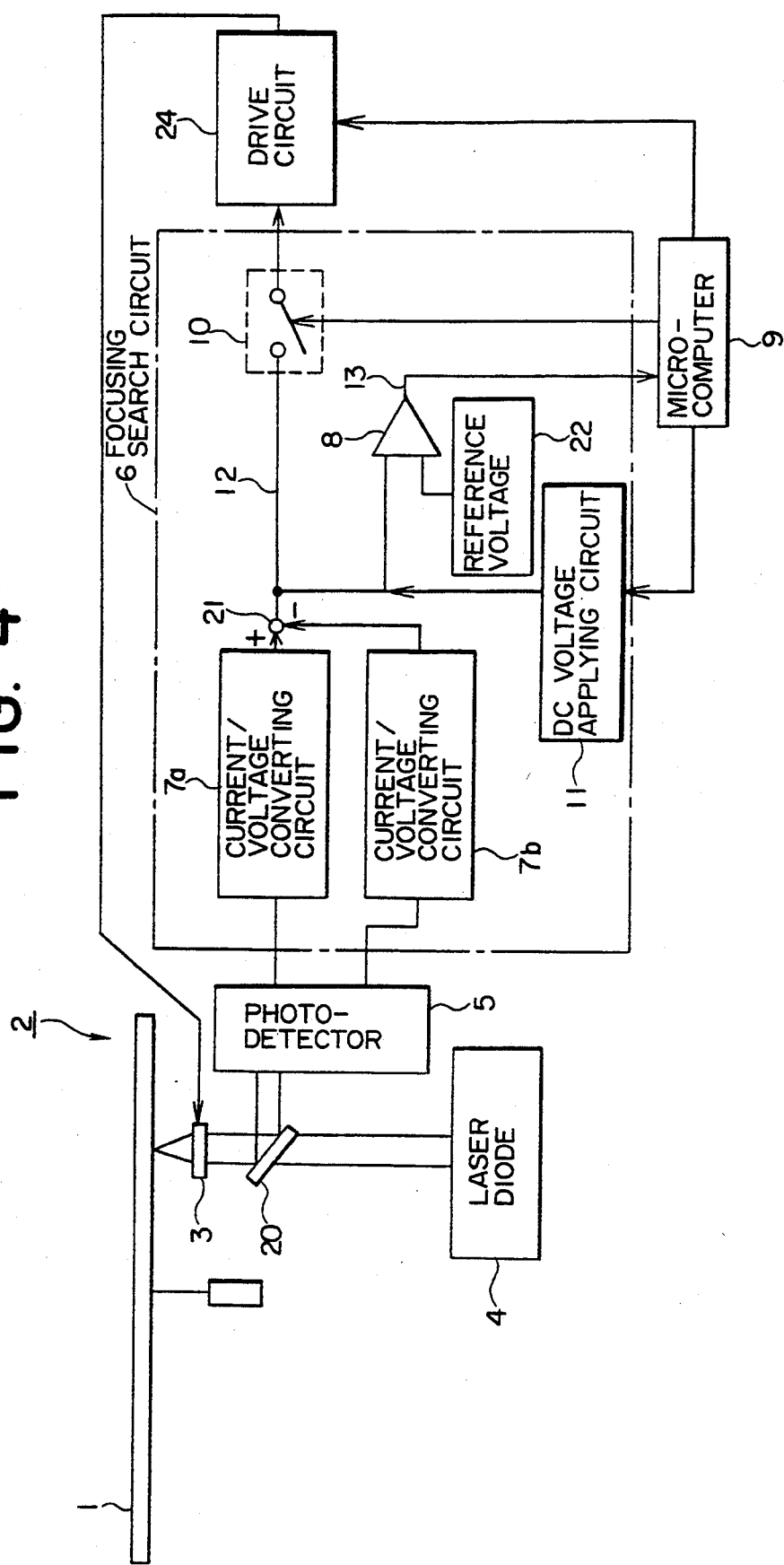
FIG. 4 is a block diagram showing an embodiment of a focusing servo circuit of the invention.

FIG. 4 is a block diagram showing an embodiment of the invention. In the figure, reference numeral 11 denotes a DC voltage applying circuit. When the embodiment shown in FIG. 4 is compared with the conventional circuit shown in FIG. 1, it will be understood that the embodiment differs from FIG. 1 with respect to only a point that the DC voltage applying circuit 11 to apply a DC voltage to the focusing error voltage 12 is connected as shown in FIG. 4. The DC voltage applying circuit 11 can be also constructed so as to generate a fixed voltage of a variable voltage.

In FIG. 4, as already described in the paragraphs of the conventional technique, when the compact disc 1 is loaded into the compact disc player 2, the microcomputer 9 first instructs the focusing search circuit 6 to perform the focusing search operation for vertically moving the objective lens 3 in a manner such that the distance between the objective lens 3 and the signal recording surface of the compact disc 1 is set to the optimum distance.

In the focusing search operation, a laser beam is emitted from the laser diode 4 and passes through the translucent mirror 20 and the objective lens 3 and is irradiated onto the signal recording surface of the compact disc 1. The reflected light from the recording surface is reflected by the mirror 20 and is detected by the photodetector 5 and is generated as current signals to the focusing search circuit 6.

The signals supplied to the focusing search circuit 6 are converted into the voltage signals by the current-/voltage converting circuits 7a and 7b. After that, a difference between the voltage signals is obtained by the differential amplifying circuit 21, so that the focusing error voltage 12 is derived. A DC bias voltage E from the DC voltage applying circuit 11 is added to the focusing error voltage 12. The resultant voltage is compared with the reference voltage 22 by the comparator 8.

When both of the voltages coincide as a result of the comparison, the output signal 13 from the comparator 8 changes and such a change is informed to the system microcomputer 9. Thus, the system microcomputer 9 turns on the focusing servo loop switch 10 (signal switching means), completing the focusing search operation. In the servo loop, the system microcomputer subsequently executes the focusing search operation to fix and maintain the objective lens 3 to the position at which the distance between the objective lens 3 and the signal recording surface of the compact disc 1 is set to the optimum distance.

Figure 5:
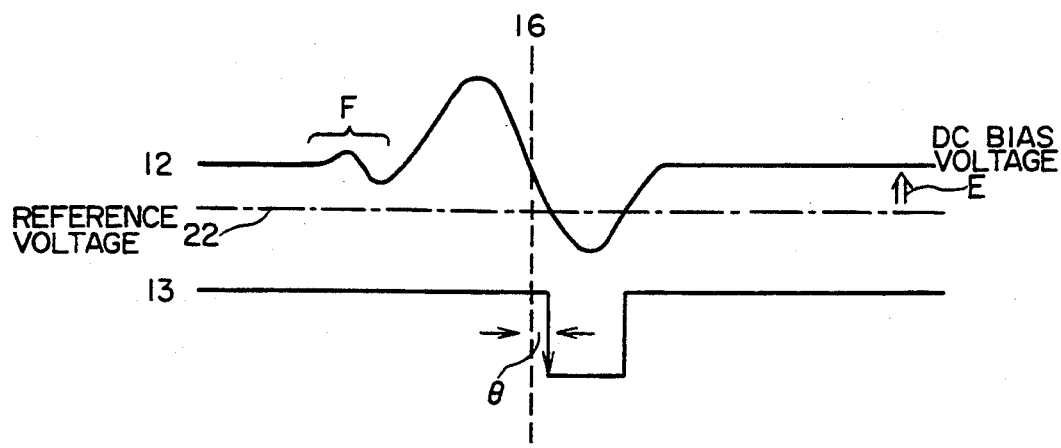
FIG. 5 is a waveform diagram showing changes in focusing error voltage and comparator output signal in the circuit of FIG. 4.

FIG. 5 is a waveform diagram showing changes in focusing error voltage 12 and comparator output signals 13 in the focusing search operation in FIG. 4.

Although the focusing search operation is executed in accordance with the operation description shown in FIG. 4, this operation uses a feature that the voltage of the output signal 12 of the photodetector fluctuates like an S-letter shape at the timing at which the distance between the objective lens 3 and the signal recording surface of the compact disc 1 is set to the optimum distance in the focusing search operation. The center position 16 of the S-letter almost corresponds to the optimum distance. In the embodiment, the voltage value of the reference voltage 22 is set to a value which is almost equal to the central voltage value before the DC bias voltage E shown in FIG. 5 is applied. The output voltage of the DC voltage applying circuit 11 is set to a value that is almost equal to the DC bias voltage E. A magnitude of the S-shaped fluctuation can be predicted by the optical system, optical disc, and the like which are used. The false voltage fluctuation F can be also similarly or experimentally predicted. Thus, it is sufficient to set the magnitude of the DC bias voltage E to a value which is larger than the magnitude of the false fluctuation F and is smaller than the magnitude of the true S-shaped fluctuation. In the embodiment, the comparator 8 detects the coincidence between the shifted focusing error signal 12 and the reference voltage and generates the comparator output signal 13. The microcomputer closes the loop switch 10 at the falling timing of the signal 13. On the other hand, in the case where the DC voltage applying circuit 11 according to the invention is not provided, the comparator 8 responds to the fluctuation of the photodetector output signal due to manufacturing and adjustment variations of the optical system and a fine defect of the compact disc and generates the false comparator output signal, so that the system microcomputer 9 erroneously sets the control timing and the focusing search operation fails. In the case where the DC voltage applying circuit 11 according to the invention is provided, however, the comparator 8 doesn't respond to a signal fluctuation that is equal to or lower than the applied DC voltage level, so that the stable focusing operation can be executed.

Explaining further in detail, it will be understood in FIG. 5 that even if the signal fluctuation F due to the manufacturing variation and the like mentioned above occurred in the focusing error voltage 12, the comparator output signal 13 doesn't change at the position of the signal fluctuation F because of the DC bias voltage E but the comparator output signal 13 changes at the position which is delayed from the normal timing 16 by only a very short distance 8.

Since the distance 8 is very small, the objective lens 3 can be moved to the optimum position by the subsequent servo pull-in operation by the servo loop. According to the invention as mentioned above, by providing the DC voltage applying circuit 11, it is prevented that the comparator 8 responds to the signal fluctuation that is equal to or lower than the applied DC voltage level, so that the stable focusing operation can be performed.

The microcomputer 9 controls the DC voltage applying circuit 11 so as to generate the DC bias voltage E during only the focusing search operation.

In the embodiment of FIG. 4, a similar effect is derived even when the reference voltage 22 is reduced by only the DC bias voltage in place of providing the DC voltage applying circuit 11. Such a modification is shown in FIG. 6 as another embodiment. In FIG. 6, it will be understood that a battery 25 of a voltage V is set to a negative polarity and is connected to the reference voltage 22, thereby reducing the reference voltage 22 by only the voltage V. It is also possible to construct the battery 25 so as to generate a fixed voltage or a variable output voltage.

Figure 7:
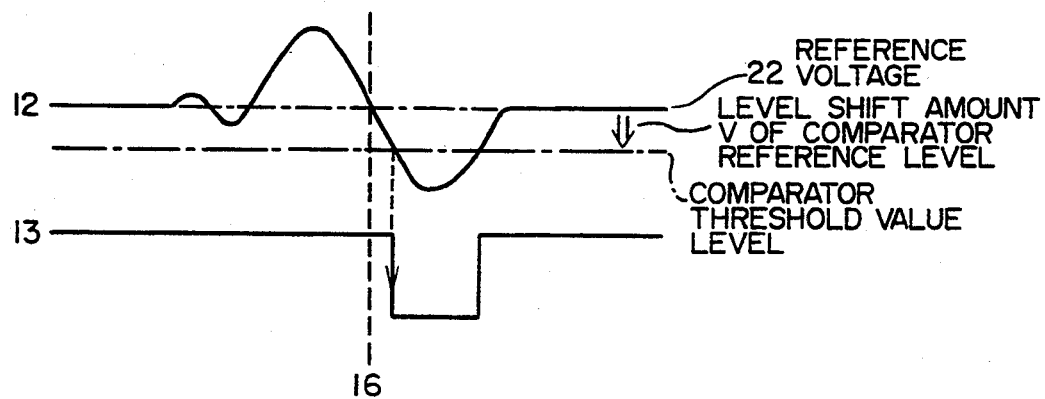
FIG. 7 is a diagram showing changes in focusing error voltage and comparator output signal 13 in the circuit of FIG. 6.

FIG. 7 is a waveform diagram showing changes in focusing error voltage 12 and comparator output signal 13 in the focusing search operation in FIG. 6. It will be recognized that an effect similar to that shown in FIG. 5 is derived.

Figure 8:
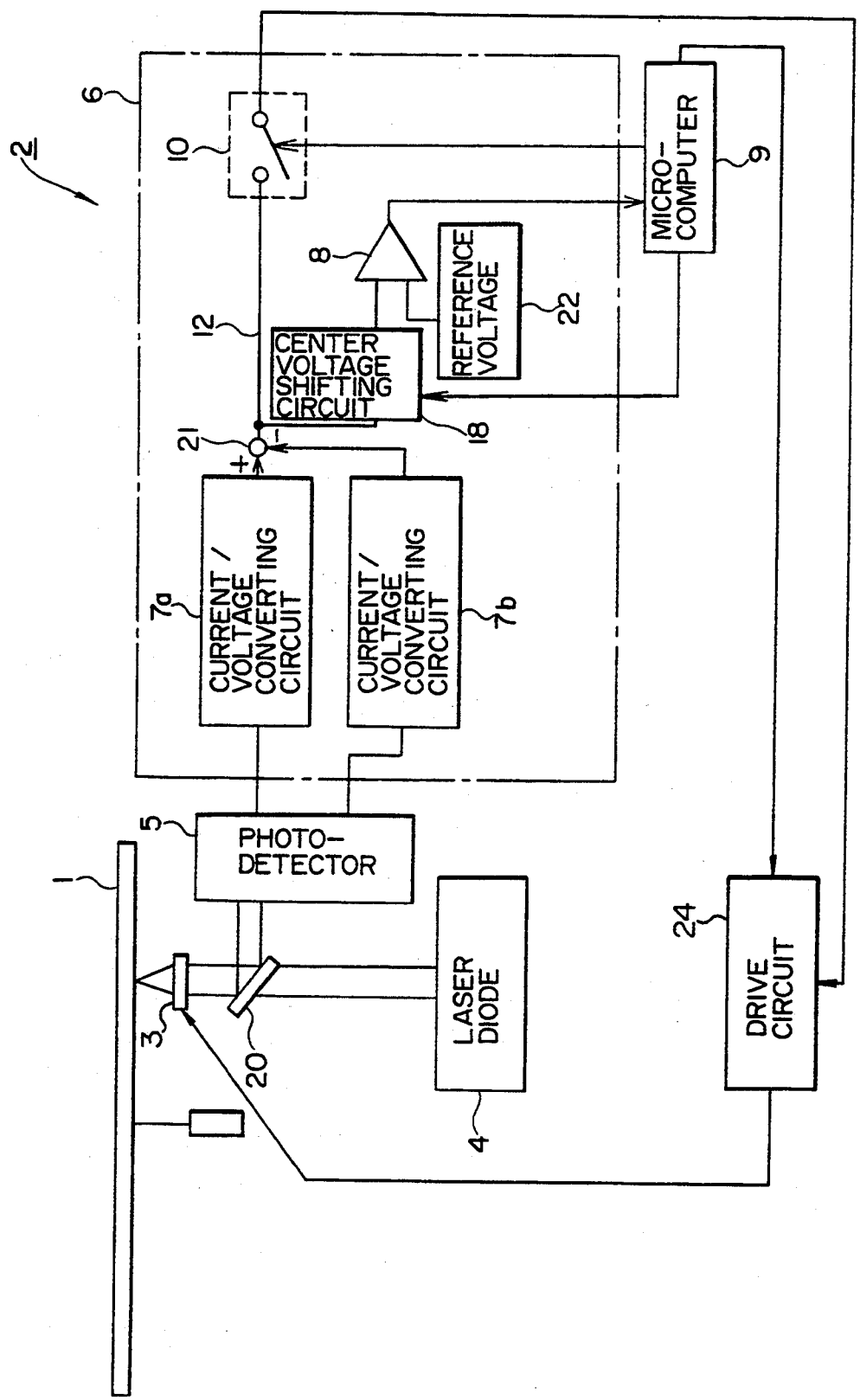
FIGS. 8 and 9 are block diagrams showing further embodiments of a focusing servo circuit of the invention, respectively.

FIG. 8 is a block diagram showing still another embodiment of the invention. According to the embodiment shown in the diagram, the reference voltage 22 for comparison of the comparator 8 is not changed but a center voltage shifting circuit 18 to shift the center voltage is provided, thereby shifting up the level of the focusing error voltage 12 by only a predetermined amount and, thereafter, supplying to the comparator 8. It will be easily understood that a similar effect is obtained even by the above method. It is also possible to construct the shift circuit so as to generate a fixed voltage or a variable output voltage.

Figure 9:
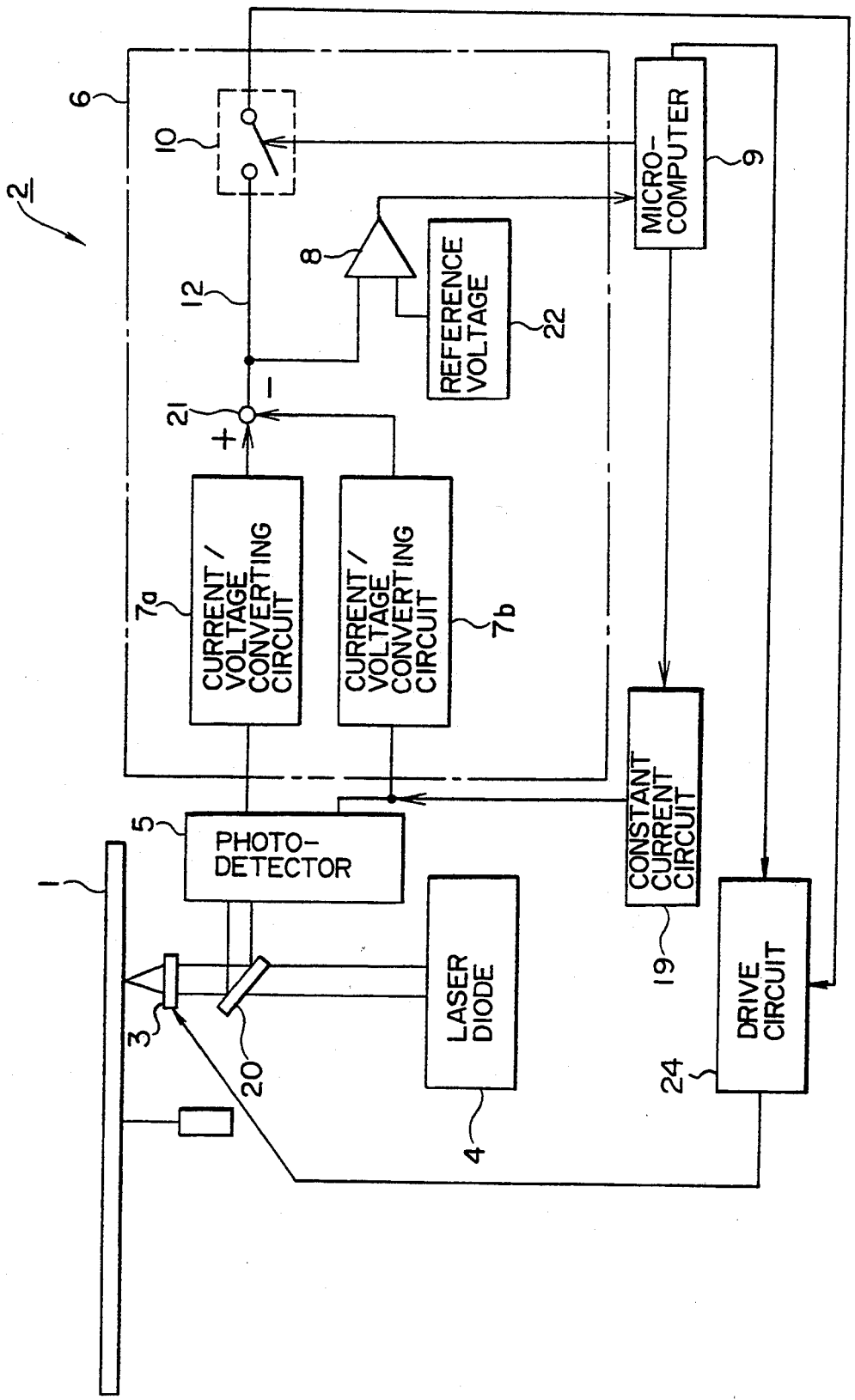

FIG. 9 is a block diagram showing further another embodiment of the invention. In the embodiment shown in the diagram, in place of providing the DC voltage applying circuit 11 and the center voltage shifting circuit 18, a constant current circuit 19 is connected between the photodetector 5 and the current/voltage converting circuit 7b, thereby indirectly shifting up the level of the focusing error voltage 12 by only a predetermined amount. A similar effect can be also obtained by the embodiment. It is also possible to construct the constant current circuit 19 so as to variably set an output current value.

According to the invention as described above, there is an advantage such that the stable focusing search operation can be executed even if a photodetector output fluctuation occurs in the focusing search operation due to manufacturing and adjustment variations of the optical system of the optical disc player, a defect of the disc, and the like.

By embodying the invention, on the other hand, there is also an advantage that permissive ranges of the manufacturing and adjustment variations of the optical system, defect of the disc, and the like are widened, and the reliability of the operation of the optical disc player and the manufacturing yield can be improved.

What is claimed is:

1. A focusing search circuit to activate a focusing servo loop of an optical disc player for driving an objective lens and focusing a laser beam onto a signal recording surface of an optical disc, comprising:

means for converting a reflected light from the signal recording surface into a voltage signal having a first set of values, said voltage signal having a predetermined known voltage when said laser beam is in an in-focus state;

means for generating a reference voltage which is substantially equal to said predetermined known voltage;

means for shifting the voltage signal from the first set of values to a different second set of values so as to have a predetermined voltage difference between the shifted voltage signal and the reference voltage; and comparing means for comparing the shifted voltage signal with the reference voltage when the objective lens is driven and for making the focusing servo loop operative when coincidence between them is detected.

2. A circuit according to claim 1, wherein said shifting means includes means, connected to an output of said converting means, for generating a voltage corresponding to said predetermined voltage difference and applying the generated voltage to said voltage signal.

3. A circuit according to claim 1, wherein said voltage signal changes at an almost constant amplitude around a predetermined center voltage when the objective lens moves to cause the laser beam to move from an out of focus state to an in focus state, and wherein said predetermined voltage difference is smaller than said constant amplitude.

4. A circuit according to claim 1, wherein said shifting means includes means, connected to said comparing means, for applying a predetermined bias voltage to said voltage signal.

5. A circuit according to claim 1, wherein said voltage signal has a substantially S-shaped waveform so that, when the objective lens continuously moves toward or away from the recording surface, said waveform shows a first peak in a first polarity direction and then shows a second peak in an opposite polarity direction, said predetermined known voltage being a voltage between said first and second peaks, and said means for shifting effecting shifting of the voltage signal in said first polarity direction.

6. A focusing search circuit to activate a focusing servo loop of an optical disc player for driving an objective lens and focusing a laser beam onto a signal recording surface of an optical disc, comprising:
 converting means which has a plurality of divided photo sensitive surfaces to receive a reflected light from the signal recording surface and converts the reflected light into voltage signals;
 subtracting means for obtaining a difference between said voltage signals and generating a focusing error signal having a first set of values, in which said focusing error signal has a voltage which changes at an almost constant amplitude around a predetermined center voltage when the objective lens moves to cause the laser beam to move from an out-of focus state to an in-focus state;
 means for generating a predetermined reference voltage which is substantially equal to said predetermined center voltage;
 means for shifting the focusing error signal from the first set of values to a different second set of values so as to have a predetermined voltage difference between the predetermined center voltage and the predetermined reference voltage; and
 comparing means for comparing the shifted focusing error signal with the predetermined reference voltage when the objective lens is driven and for making the focusing servo loop operative when a coincidence between them is detected.

7. A circuit according to claim 6, wherein said predetermined voltage difference is smaller than said constant amplitude.

8. A circuit according to claim 6, wherein said shifting means includes means, connected to said comparing means, for applying a predetermined bias voltage to said focusing error signal.

9. A circuit according to claim 6, wherein said focusing error signal has a substantially S-shaped waveform so that, when the objective lens continuously moves toward or away from the recording surface, said waveform shows a first peak in a first polarity direction and then shows a second peak in an opposite polarity direction, and said means for shifting effecting shifting of said focus error signal in said first polarity direction.

10. A focusing servo circuit of an optical disc player, comprising:
 a light source for generating a laser beam;
 an objective lens for focusing the laser beam onto a signal recording surface of an optical disc;
 means for driving the objective lens;
 means for converting a reflected light from the signal recording surface into a voltage signal having a first set of values, in which said voltage signal has a predetermined known voltage when the laser beam is in an in-focus state;
 means for generating a reference voltage that is substantially equal to said predetermined known voltage;
 means for shifting the voltage signal from the first set of values to a different second set of values so as to have a predetermined voltage difference between the shifted voltage signal and the reference voltage;
 comparing means for comparing the shifted voltage signal with the reference voltage when the objective lens is in a focusing search mode and for detecting a coincidence between them; and
 a servo loop responsive to said comparing means, for keeping the objective lens in the in-focus state, said driving means constituting a part of said servo loop.

11. A circuit according to claim 10, wherein said voltage signal has a substantially S-shaped waveform so that, when the objective lens continuously moves toward or away from the recording surface, said waveform shows a first peak in a first polarity direction and then shows a second peak in an opposite polarity direction, said predetermined known voltage being a voltage between said first and second peaks, and said means for shifting effecting shifting of said voltage signal in said first polarity direction.

12. A focusing servo circuit of an optical disc player, comprising:
 a light source to generate a laser beam;
 an objective lens to focus the laser beam onto a signal recording surface of an optical disc;
 means for driving the objective lens;
 converting means having a plurality of divided photo sensitive surfaces to receive a reflected light from the signal recording surface and converting the reflected light into voltage signals;
 subtracting means for obtaining a difference between the voltage signals and for generating a focusing error signal having a first set of values, said focusing error signal having a voltage which changes at an almost constant amplitude around a predetermined center voltage when the objective lens moves to cause the laser beam to move from an out-of focus state to an in-focus state;
 means for generating a predetermined reference voltage which is substantially equal to said predetermined center voltage;
 means for shifting the focusing error signal from the first set of values to a different second set of values so as to have a predetermined voltage difference between the predetermined center voltage and the predetermined reference voltage;
 comparing means for comparing the shifted focusing error signal with the predetermined reference voltage when the objective lens moves and for detecting a coincidence between them; and
 switching means responsive to the comparing means, for supplying the focusing error signal to the driving means, said driving means holding the objective lens in the in-focus state.

13. A circuit according to claim 12, wherein said shifting means includes means, connected to said comparing means, for applying a predetermined bias voltage to said focusing error signal.

14. A circuit according to claim 12, wherein said focusing error signal has a substantially S-shaped waveform so that, when the objective lens continuously moves toward or away from the recording surface, said waveform shows a first peak in a first polarity direction and then shows a second peak in an opposite polarity direction, and said means for shifting effecting shifting of said focus error signal in said first polarity direction.

* * * * *